United States Patent [19]

Irifune

[11] Patent Number: 4,858,897
[45] Date of Patent: Aug. 22, 1989

[54] SPRING

[76] Inventor: Hideki Irifune, 225-3, Nakatsu, Kakogawa-cho, Kakogawa-shi, Hyogo-Prefecture, Japan

[21] Appl. No.: 120,841

[22] Filed: Nov. 16, 1987

[51] Int. Cl.[4] .................................................. F16F 1/02
[52] U.S. Cl. ........................................ 267/181; 464/78
[58] Field of Search ............... 267/181, 161, 162, 163; 464/78, 88

[56] References Cited

U.S. PATENT DOCUMENTS

| | | | |
|---|---|---|---|
| 2,595,818 | 5/1952 | Smila | 267/181 X |
| 3,455,013 | 7/1969 | Rayburn | 464/78 X |
| 3,844,137 | 10/1974 | Fugel | 464/78 |

FOREIGN PATENT DOCUMENTS

| | | | |
|---|---|---|---|
| 659821 | 2/1929 | France | 267/181 |
| 1090004 | 10/1954 | France | 267/181 |
| 52-66133 | 6/1977 | Japan | |
| 61-137120 | 8/1986 | Japan | |
| 188233 | 10/1966 | U.S.S.R. | 464/78 |

Primary Examiner—George E. A. Halvosa
Attorney, Agent, or Firm—Wenderoth, Lind & Ponack

[57] ABSTRACT

A cylinder having a bore extending therethrough is formed with pairs of slits arranged axially of the cylinder at a predetermined spacing, the slits in each pair being opposed to each other diametrically of the cylinder. Like a coiled spring, the cylinder is adapted to perform a spring action against tension, compression or torsion.

4 Claims, 2 Drawing Sheets

SPRING

BACKGROUND OF THE INVENTION

The present invention relates to a spring for use in the machine industry and other industries such as the automotive industry as a compression, tension or torsion spring, and more particularly to a novel spring which is usable in place of a coiled spring.

Compression, tension or torsion springs are generally known as coiled springs and are in wide use. Such conventional springs are produced by pressing a steel wire against a core and winding the wire into a coil using a special machine such as a coiling machine. Accordingly, making coiled springs is not a simple process and requires an expensive machine. Moreover, there are various kinds of small to large coiled springs, which can not be produced by a single machine but need several machines. Thus, great equipment is required which renders the product costly.

For example, when a coiled spring is used for rotational power transmission utilizing the torsion of the coil, there arises a difference in the transmitted power between the coil winding direction and the reverse direction owing to the nature of the helix, consequently entailing the problem that the device concerned backlashes upon starting up or stopping (braking).

SUMMARY OF THE INVENTION

An object of the present invention, which has been accomplished to overcome the foregoing problems, is to provide a spring which can be produced without using a special machine, such as coiling machine, and which nevertheless is at least equivalent in function to coiled springs.

Another object of the invention is to provide a spring which permits power transmission with a uniform torque free of any backlash irrespective of whether the torsional force involved acts in the forward or reverse direction.

Another object of the invention is to provide a spring which is easy to produce at a low cost with high precision.

DESCRIPTION OF THE PREFERRED EMBODIMENTS

Figure 1:
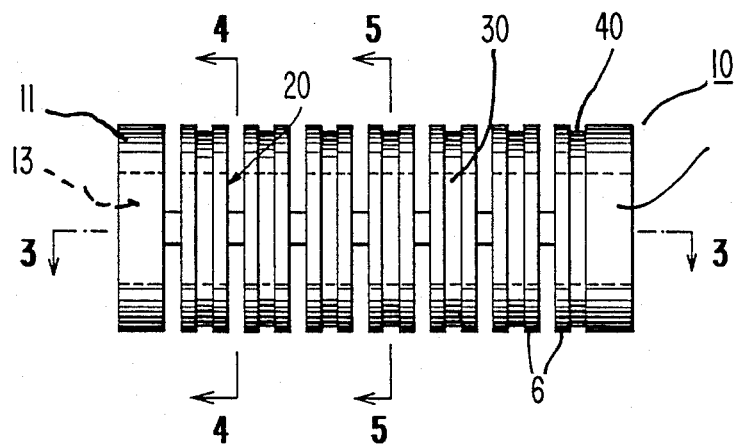
FIG. 1 is a front view of a spring embodying the invention.
Figure 2:
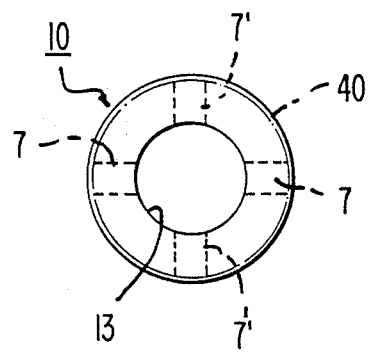
FIG. 2 is a side elevation of the spring.
Figure 3:
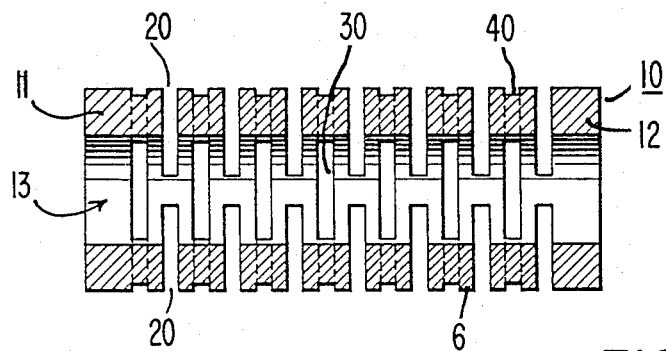
FIG. 3 is a view in section taken along the line 3—3 in FIG. 1.
Figure 4:
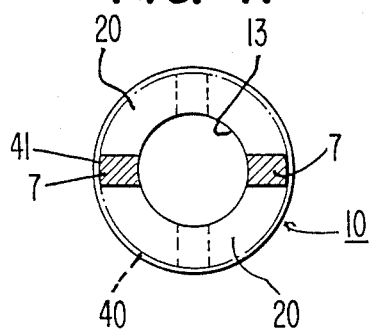
FIG. 4 and FIG. 5 are views in section taken along the lines 4—4 and 5—5, respectively, in FIG. 1.
Figure 5:
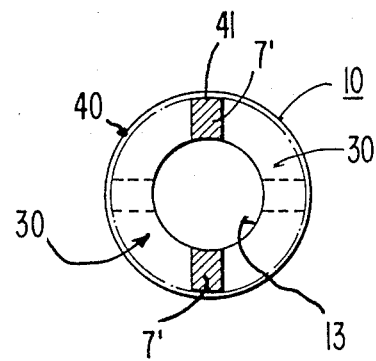

FIGS. 1 to 5 show a spring of the invention. The body of the spring is prepared from a hollow cylinder 10 which is made of aluminum, brass or like light alloy, steel having high spring properties, or a molded ceramic material.

The cylinder 10 has opposite ends 11, 12 and a bore 13 extending therethrough coaxially therewith.

Pairs of first slits 20 and pairs of second slits 20 are formed in the cylinder 10, as arranged alternately axially of the cylinder at a predetermined spacing. The slits in each pair are opposed to each other diametrically of the cylinder, and each slit 20 is at an angle of 90 degrees about the axis of the cylinder with respect to the slit 30 immediately adjacent thereto. While the arrangement described above is desirable, the pair of slits can be replaced by three or four slits equidistantly spaced apart about the cylinder axis. The slits 20, 30 communicate with the bore 13.

When the cylinder 10 used is made of steel, the cylinder completely machined as by slitting is subjected to heat treatments including hardening and tempering.

Figure 7:
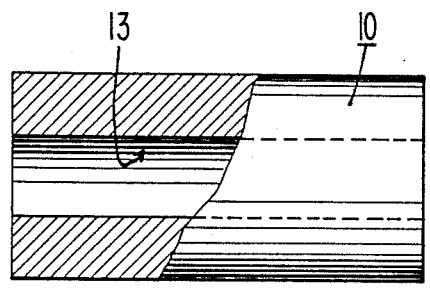
FIG. 7 is a front view partly in section and showing a hollow cylinder before machining.
Figure 8:
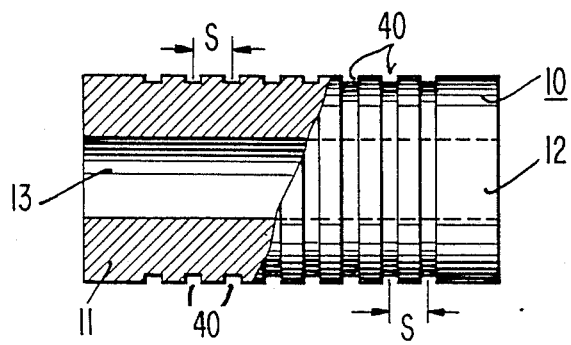
FIG. 8 is a front view partly in section and showing the cylinder with lead grooves formed therein.
Figure 9:
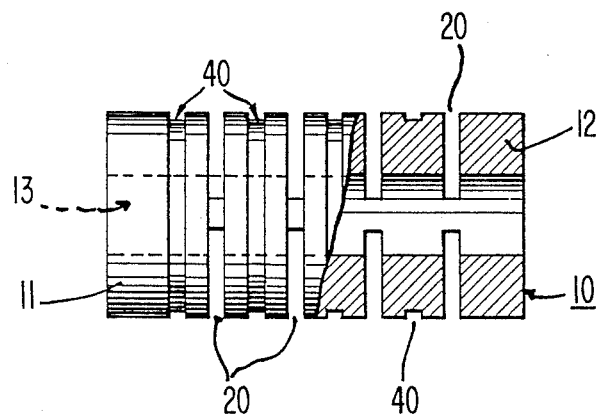
FIG. 9 is a front view partly in section and showing the cylinder with first slits formed therein.

FIGS. 7 to 9 show a process for producing the spring of the invention.

Shallow annular lead grooves 40 are formed by a lead cutter in the outer peripheral surface of the hollow cylinder 10 shown in FIG. 7 at a predetermined pitch S (see FIG. 8). The lead grooves 40, which are shallow, are out of communication with the bore 13.

Next, slits 20 and 30 are formed by placing a slit cutter into the lead grooves 40. First, the cutter is pressed against the cylinder 10 on diametrically opposite sides thereof at every other grooves 40, for example, at the first, third, fifth, . . . . grooves from one end of the cylinder, to form the first slits 20. The cylinder 10 is then rotated through 90 degrees about its axis, and the cutter is then similarly pressed against the cylinder at the second, fourth, sixth, . . . . grooves 40 to form the second slits 30, whereby the spring shown in FIGS. 1 to 5 is obtained. The width of the slits 20, 30 is equal to or slightly smaller than the width of the lead grooves 40. The slits are perpendicular to the axis.

When the pairs of first and second diametrically opposed slits 20, 30 are formed, thin wall portions 6 are formed between the slits 20, 30, as arranged axially of the spring, while connecting portions 7 (7') are formed between the opposed slits 20 (30) in each pair.

When the first and second slits 20 and 30 are formed in the cylinder 10 at the lead grooves 40, the grooves 40 thereafter partially remain as indicated at 41. These groove portions 41 are shallow and therefore exert little or no influence on the strength of the spring, while the presence of these portions affords improved spring properties.

Figure 6:
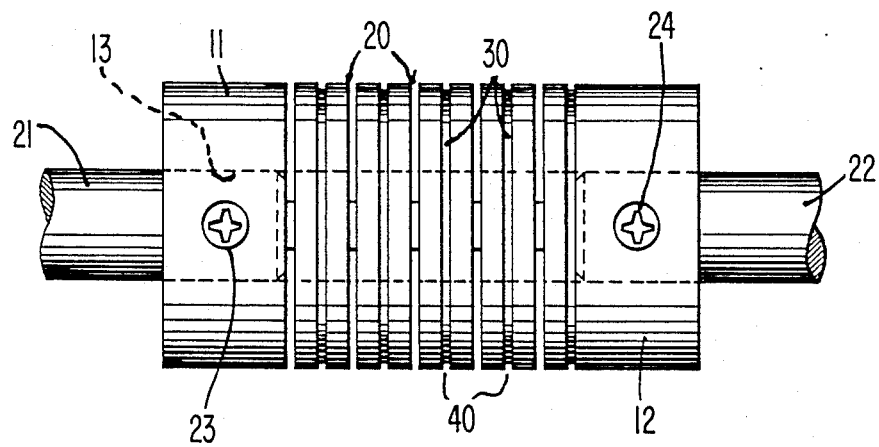
FIG. 6 is a front view showing the spring of the invention as it is used as a shock-absorbing coupling.

FIG. 6 shows an embodiment of the invention wherein the spring of the invention is used as a shaft coupling for transmitting rotational power.

As seen in this drawing, an input shaft 21 is inserted into the bore 13 of the cylinder 10 at its one end 11, and an output shaft 22 is similarly inserted into the other end 12. The shafts are fixed to the cylinder with set bolts 23 and 24.

When the input shaft 21 is drivingly rotated in one direction, the rotation is transmitted to the output shaft 22 through the cylinder 10 serving as a coupling. The cylinder 10 performs a shock absorbing action owing to the presence of the first and second slits 20, 30, the thin wall portions 6 between the slits and the connecting portions 7, 7', acting to mitigate impact when the input shaft is brought into or out of rotation or braked. The same result is achieved when the direction of rotation is forward or reverse. The present spring is usable also as a tension or compression spring.

The spring of the invention has the following advantages.

(1) Since the slits are not helical, the spring reaction against compression, tension or torsion is uniform. Especially, no difference results from whether torsion is in the forward or reverse direction.

(2) The spring can be produced easily at a low cost since no special machine is used unlike coiled springs which are prepared by winding a wire into a coil.

(3) Because the slits are formed at the lead grooves using a lead cutter and a slit cutter, the lead groove serves as a guide for slitting, assuring accurate machining without permitting lateral deflection of the cutter.

What is claimed is:

1. A spring comprising a hollow cylinder having a wall defining a bore extending therethrough coaxially therewith, a plurality of shallow annular lead grooves arranged axially of said cylinder at a first predetermined spacing and extending perpendicular to the axis of said cylinder, said plurality of shallow annular lead grooves being in the outer peripheral surface of said cylinder and extending into said wall of said hollow cylinder less than the thickness of said wall, said cylinder having a plurality of groups of slits arranged axially of the cylinder at a second predetermined spacing, said second predetermined spacing being a multiple of and coincident with said first predetermined spacing, said plurality of groups of slits extending perpendicular to the axis of said cylinder and through said wall for communicating with said bore, said slits in each group of slits being disposed around the cylinder axis and equidistantly spaced apart circumferentially of the cylinder, each said slit group including a pair of slits opposed to each other diametrically of the cylinder, each two axially adjacent slits being displaced from each other by 90 degrees about the cylinder axis, and the width of each said slit being equal to or less than the width of each said shallow groove.

2. A spring comprising a hollow cylinder having a wall defining a bore extending therethrough coaxially therewith, a plurality of shallow annular lead grooves arranged axially of said cylinder at a first predetermined spacing and extending perpendicular to the axis of said cylinder, said plurality of shallow annular lead grooves being in the outer peripheral surface of said cylinder and extending into said wall of said hollow cylinder less than the thickness of said wall, said plurality of shallow annular lead grooves extending around the entire circumference of said outer peripheral surface of said cylinder, said cylinder having a plurality of groups of nonannular slits arranged axially of the cylinder at a second predetermined spacing, said second predetermined spacing being a multiple of and coincident with said first predetermined spacing, said plurality of groups of nonannular slits extending perpendicular to the axis of said cylinder and through said wall for communicating with said bore, said nonannular slits in each group of nonannular slits being disposed around the cylinder axis and equidistantly spaced apart circumferentially of the cylinder, each two axially adjacent nonannular slits being displaced from each other by a specified angle about the cylinder axis, and the width of each said nonannular slit being equal to or less than the width of each said shallow annular lead groove.

3. A spring as defined in claim 2 wherein each slit group comprises a pair of slits opposed to each other diametrically of the cylinder, and each two axially adjacent slits are displaced from each other by 90 degrees about the cylinder axis.

4. A spring as defined in claim 2 wherein thin wall portions of a specified width are formed between the groups of slits arranged axially of the cylinder, and connecting portions are provided between the slits in each group.

* * * * *